UNITED STATES PATENT OFFICE.

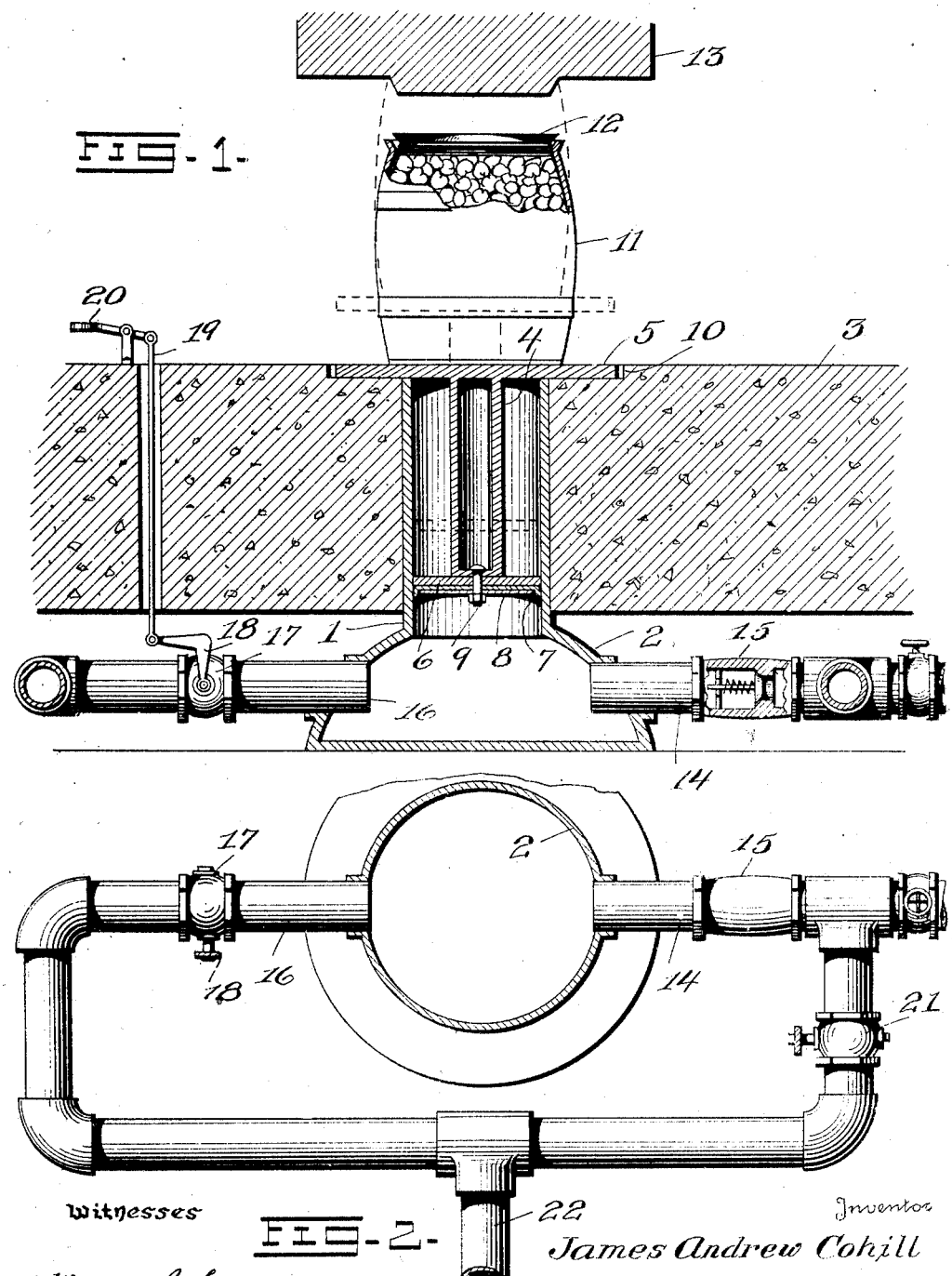

JAMES ANDREW COHILL, OF HANCOCK, MARYLAND.

BARREL-PRESS.

1,373,055.  Specification of Letters Patent.  Patented Mar. 29, 1921.

Application filed June 11, 1919. Serial No. 303,304.

*To all whom it may concern:*

Be it known that I, JAMES A. COHILL, a citizen of the United States, and a resident of Hancock, in the county of Washington and State of Maryland, have invented certain new and useful Improvements in Barrel-Presses, of which the following is a specification.

My invention is an improvement in barrel presses, and has for its object to provide a device of the character specified especially adapted for placing the heads in filled barrels, as, for instance, barrels filled with apples, potatoes or the like, wherein a fluid pressure controlled plunger is provided upon which the barrel is placed, the said plunger being at the floor level for facilitating the placing of the barrel, and wherein controlling mechanism is provided for causing the fluid to move the plunger upwardly to lift the barrel into contact with a fixed abutment, to force the head into place.

In the drawings:

Figure 1 is a sectional view of the improved press;

Fig. 2 is a horizontal section.

In the present embodiment of the invention a cylinder 1 is provided, having the bottom 2 enlarged as shown, the upper portion of the cylinder being of uniform cross section, and the top of the cylinder is arranged slightly below the level of the floor 3 of the building in which the press is used.

A plunger is arranged within the cylinder, the said plunger comprising a shell 4 having secured to the upper end thereof a plate 5 and to the lower end a disk 6, which has a packing 7 of leather or the like, the packing being held in place by a disk 8 which is secured to the disk 6 and to the shell 4 by a bolt and nut 9.

The plate 5 normally rests in a counterbore 10 in the floor, and the barrel, indicated at 11, filled with the fruit or vegetables to be packed, is placed upon the plate at the center thereof, as shown in Fig. 1, with the head 12 resting upon the fruit or vegetables in the barrel.

A fixed abutment 13 is arranged above the plate 5, the said abutment being adapted to fit within the upper end of the barrel to force the head into place, when the barrel is moved upward. Fluid under pressure, as, for instance, water, is supplied to the enlargement 2 of the cylinder by a pipe 14. A spring controlled check valve 15 is arranged in this pipe, and the pipe may be connected with a suitable means for supplying the water under pressure, as, for instance, a pump or a city main.

The exhaust water passes from the enlargement 2 by means of a pipe 16. A valve, indicated at 17, is interposed in the length of this pipe, and one arm of a bell crank 18 is connected with the stem of the valve. A link 19 connects the other arm of the bell crank with a treadle 20 arranged adjacent to the plate 5 above the floor, the link passing through an opening in the floor as shown. When the treadle is depressed the valve is opened, and the exhaust water may flow through the pipe 16 back to the circulation. This valve 16, as shown in Fig. 2, connects with the pipe 14 on the outer side of the check valve 15, and a valve 21 is interposed in the pipe. A pipe 22 leads from the pipe 16 between the valves 17 and 21, as shown, and when a pump is used this pipe 22 is connected with the pump, as is also the pipe 14.

In the operation of the device, when the barrel has been placed upon the plate 5, pressure is admitted through the pipe 14 to the cylinder, the said pressure being controlled by a suitable valve, the valves 18 and 21 being meanwhile closed. The plunger is forced upwardly, carrying with it the plate 5 and the barrel, and the head 12 on the barrel is moved against the abutment 13. Thus the head 12 is forced into place on the barrel.

If it is necessary to correct the placing of the head at any time, the movement of the plunger may be easily controlled to move or check the plunger, as may be desired. When the head is in place the treadle 20 is operated, and the water may now flow by way of the valve 18 to the pump, or to the place of discharge when the pressure is taken from a city main.

It will be understood that suitable controlling mechanism is provided for the valve 21, corresponding to that shown for the valve 17. This mechanism is indicated generally at 24.

I claim:

A press of the character described comprising in combination with a floor, a cylinder extending partly through the floor and having movable therein a plunger carrying at its upper end a plate closing the top of the cylinder and fitting flush within a countersunk recess in the floor, a fixed abutment above the plate adapted for engagement by the article to be pressed when the plunger is moved upwardly, and means for raising and lowering the plunger comprising pipes communicating with the cylinder and disposed beneath the floor, one pipe serving to admit fluid under pressure and the other serving to exhaust the same, a check valve in the inlet pipe, control valves in both pipes, and means for operating the control valve comprising a pedal pivoted on the floor, an arm carried by the valve stem, and a rod passing through the floor and connected with the pedal and said arm.

JAMES ANDREW COHILL.